(12) United States Patent
Muraoka et al.

(10) Patent No.: US 11,797,425 B2
(45) Date of Patent: Oct. 24, 2023

(54) DATA AUGMENTATION BASED ON FAILURE CASES

(71) Applicant: INTERNATIONAL BUSINESS MACHINES CORPORATION, Armonk, NY (US)

(72) Inventors: Masayasu Muraoka, Bunkyo-ku (JP); Issei Yoshida, Setagaya-ku (JP); Tetsuya Nasukawa, Kawasaki (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 119 days.

(21) Appl. No.: 17/372,037

(22) Filed: Jul. 9, 2021

(65) Prior Publication Data

US 2023/0027777 A1    Jan. 26, 2023

(51) Int. Cl.
*G06F 11/36* (2006.01)
*G06F 18/214* (2023.01)

(52) U.S. Cl.
CPC ...... *G06F 11/3684* (2013.01); *G06F 11/3688* (2013.01); *G06F 11/3692* (2013.01); *G06F 18/214* (2023.01)

(58) Field of Classification Search
CPC ............. G06F 11/3688; G06F 11/3692; G06K 9/6256
See application file for complete search history.

(56) References Cited

U.S. PATENT DOCUMENTS

| | | | | |
|---|---|---|---|---|
| 4,783,804 A | * | 11/1988 | Juang | G10L 15/14 704/256 |
| 2008/0270329 A1 | * | 10/2008 | Long | G06N 20/00 706/12 |
| 2015/0254555 A1 | | 9/2015 | Williams, Jr. et al. | |
| 2018/0286385 A1 | * | 10/2018 | Ganapathiraju | G10L 15/01 |
| 2019/0244253 A1 | * | 8/2019 | Vij | G06F 18/214 |
| 2020/0026632 A1 | * | 1/2020 | Brinkmann | G06F 11/0706 |
| 2020/0202171 A1 | * | 6/2020 | Hughes | G06F 18/214 |

(Continued)

OTHER PUBLICATIONS

Mell et al., "The NIST Definition of Cloud Computing", National Institute of Standards and Technology, Special Publication 800-145. Sep. 2011, pp. 1-7.

(Continued)

*Primary Examiner* — Wei Y Zhen
*Assistant Examiner* — Brahim Bourzik
(74) *Attorney, Agent, or Firm* — Tutunjian & Bitetto, P.C.; Robert Richard Aragona

(57) ABSTRACT

A computer-implemented method is provided for data augmentation. The method includes receiving a set of different base models already pretrained and a set of different test cases. The method further includes collecting a plurality of prediction results of the set of different test cases from the set of different base models. The method also includes identifying a test case as a candidate for the data augmentation based on a number of models in the set of different base models which fail to solve the test case. The method additionally includes augmenting, by a processor device, the identified test case with additional data to form an augmented training dataset. The method further includes retraining at least some of the different base models with the augmented training dataset.

20 Claims, 11 Drawing Sheets

| Cases | Model 1 | Model 2 | Model 3 | SevScore (Simple) | SevScore (Elaborated) |
|---|---|---|---|---|---|
| Case 1 | × | ○ | ○ | 1 | 1 |
| Case 2 | × | × | ○ | 1 | 0.5 |
| Case 3 | × | × | × | 0 | 0 |
| Case 4 | ○ | ○ | ○ | 0 | 0 |

(56) References Cited

U.S. PATENT DOCUMENTS

| | | | | |
|---|---|---|---|---|
| 2020/0272853 | A1* | 8/2020 | Zoldi | G06F 18/214 |
| 2020/0320371 | A1* | 10/2020 | Baker | G06N 3/0454 |
| 2020/0349395 | A1* | 11/2020 | Nushi | G06F 11/3692 |
| 2021/0027116 | A1* | 1/2021 | Monaghan | G06F 18/214 |
| 2021/0142181 | A1* | 5/2021 | Liu | G06N 3/088 |
| 2021/0407514 | A1* | 12/2021 | Laird | G10L 15/32 |

OTHER PUBLICATIONS

Liu, Weijie, et al. "FastBERT: A Self-distilling BERT with Adaptive Inference Time", arXiv preprint arXiv:2004.02178. Apr. 5, 2020, pp. 6035-6044.

Duan, Sufeng, et al. "Syntax-aware Data Augmentation for Neural Machine Translation", arXiv preprint arXiv:2004.14200. Apr. 29, 2020, pp. 1-9.

Ferraro, Jeffrey P., et al. "Improving Performance of Natural Language Processing Part-of-speech Tagging on Clinical Narratives through Domain Adaptation", Journal of the American Medical Informatics Association : JAMIA. 20.10.1136/amiajnl-2012-001453. Mar. 2013, pp. 1-10.

Ranasinghe, Gishan Don, et al. "Generating Real-Valued Failure Data for Prognostics Under the Conditions of Limited Data Availability", In2019 IEEE International Conference on Prognostics and Health Management (ICPHM), IEEE. Jun. 17, 2019, pp. 1-8.

Rush, Alexander M., et al. "Improved Parsing and POS Tagging Using Inter-Sentence Consistency Constraints", InProceedings of the 2012 joint conference on empirical methods in natural language processing and computational natural language learning. Jul. 2012, pp. 1434-1444.

Fu, Qiang, et al. "A Novel Deep Learning System with Data Augmentation for Machine Fault Diagnosis from Vibration Signals", Applied Sciences. Jan. 2020, pp. 1-21.

Nivre, Joakim, et al. "Universal Dependencies v2: An Evergrowing Multilingual Treebank Collection", Proceedings of the 12th Conference on Language Resources and Evaluation (LREC 2020), Marseille, European Language Resources Association (ELRA), licensed under CC-BY-NC. May 2020, pp. 4034-4043.

Ng, Nathan, et al. "SSMBA: Self-Supervised Manifold Based Data Augmentation for Improving Out-of-Domain Robustness", Proceedings of the 2020 Conference on Empirical Methods in Natural Language Processing, 2020 Association for Computational Linguistics. Nov. 2020, pp. 1268-1283.

Liu, Yinhan, et al. "RoBERTa: A Robustly Optimized BERT Pretraining Approach", arXiv preprint arXiv:1907.11692. Jul. 26, 2019, pp. 1-13.

Zmigrod, Ran, et al. "Counterfactual Data Augmentation for Mitigating Gender Stereotypes in Languages with Rich Morphology", arXiv preprint arXiv:1906.04571. Jun. 11, 2019, pp. 1-11.

Anonymous, "Instructions for Reviewers", EMNLP 2020. Nov. 2020, pp. 1-2.

Yang, Jie, et al. "Design Challenges and Misconceptions in Neural Sequence Labeling", arXiv preprint arXiv:1806.04470. Jun. 12, 2018, pp. 3879-3889.

Gao, Fei, et al. "Soft Contextual Data Augmentation for Neural Machine Translation", InProceedings of the 57th Annual Meeting of the Association for Computational Linguistics. Jul. 2019, pp. 5539-5544.

Devlin, Jacob, et al. "BERT: Pre-training of Deep Bidirectional Transformers for Language Understanding", Proceedings of NAACL-HLT 2019, Minneapolis, Minnesota, 2019 Association for Computational Linguistics. Jun. 2019, pp. 4171-4186.

Reimers, Nils, et al. "Sentence—BERT: Sentence Embeddings using Siamese BERT-Networks", Proceedings of the 2019 Conference on Empirical Methods in Natural Language Processing and the 9th International Joint Conference on Natural Language Processing, Hong Kong, China, 2019 Association for Computational Linguistics. Nov. 2019, pp. 3982-3992.

Kumar, Varun, et al., "Data Augmentation Using Pre-trained Transformer Models", Proceedings of the Second Workshop on Life-long Learning for Spoken Language Systems, 2020 Association for Computational Linguistics. Dec. 7, 2020, pp. 18-26.

Zhu, Yukun, et al. "Aligning Books and Movies: Towards Story-like Visual Explanations by Watching Movies and Reading Books", InProceedings of the IEEE international conference on computer vision 2015. Jun. 22, 2015, pp. 1-23.

El-Kurdi, Yousef, et al. "Scalable Cross-lingual Treebank Synthesis for Improved Production Dependency Parsers", InProceedings of the 28th International Conference on Computational Linguistics: Industry Track, Barcelona, Spain. Dec. 12, 2020, pp. 172-178.

Yu, Shi. "Part-of-Speech Tutuorial: RB vs. RP", https://sites.google.com/site/partofspeechhelp/home/rb_rp. Jun. 4, 2021, pp. 1-2.

* cited by examiner

DATA AUGMENTATION BASED ON FAILURE CASES

BACKGROUND

The present invention generally relates to error analysis, and more particularly to data augmentation based on failure cases.

When a machine learning model is trained for an NLP task such as Part of Speech (PoS) tagging and classification in a process of product development, the model needs to be incrementally improved in product development.

In an evaluation of the trained model, it is often very important to focus on error cases. An error case is a test case in which the current model fails to produce the expected result.

It is desirable to fix error cases of a current model in a future model. The problem is that there seem no good ways to find the most significant error cases in terms that fixing them would be the most efficient in improvement of the model. Hence, there is a need for an improved data augmentation method.

SUMMARY

According to aspects of the present invention, a computer-implemented method is provided for data augmentation. The method includes receiving a set of different base models already pretrained and a set of different test cases. The method further includes collecting a plurality of prediction results of the set of different test cases from the set of different base models. The method also includes identifying a test case as a candidate for the data augmentation based on a number of models in the set of different base models which fail to solve the test case. The method additionally includes augmenting, by a processor device, the identified test case with additional data to form an augmented training dataset. The method further includes retraining at least some of the different base models with the augmented training dataset.

According to other aspects of the present invention, a computer program product is provided for data augmentation. The computer program product includes a non-transitory computer readable storage medium having program instructions embodied therewith. The program instructions are executable by a computer to cause the computer to perform a method. The method includes receiving, by a processor device of the computer, a set of different base models already pretrained and a set of different test cases. The method further includes collecting, by the processor device, a plurality of prediction results of the set of different test cases from the set of different base models. The method also includes identifying, by the processor device, a test case as a candidate for the data augmentation based on a number of models in the set of different base models which fail to solve the test case. The method additionally includes augmenting, by the processor device, the identified test case with additional data to form an augmented training dataset. The method further includes retraining, by the processor device, at least some of the different base models with the augmented training dataset.

According to yet other aspects of the present invention, a computer processing system is provided for data augmentation. The computer processing system includes a memory device for storing program code. The computer processing system further includes a processor device operatively coupled to the memory device for running the program code to receive a set of different base models already pretrained and a set of different test cases. The processor device further runs the program code to collect a plurality of prediction results of the set of different test cases from the set of different base models. The processor device also runs the program code to identify a test case as a candidate for the data augmentation based on a number of models in the set of different base models which fail to solve the test case. The processor device additionally runs the program code to augment the identified test case with additional data to form an augmented training dataset. The processor device further runs the program code to retrain at least some of the different base models with the augmented training dataset.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention are directed to data augmentation based on failure cases.

Embodiments of the present invention propose a data augmentation method that includes: a ranking/scoring method to rank/score error cases for their severities to focus on them in the next training and to effectively and efficiently choose additional training data; and an augmentation method to augment data based on severe error cases.

Figure 1:
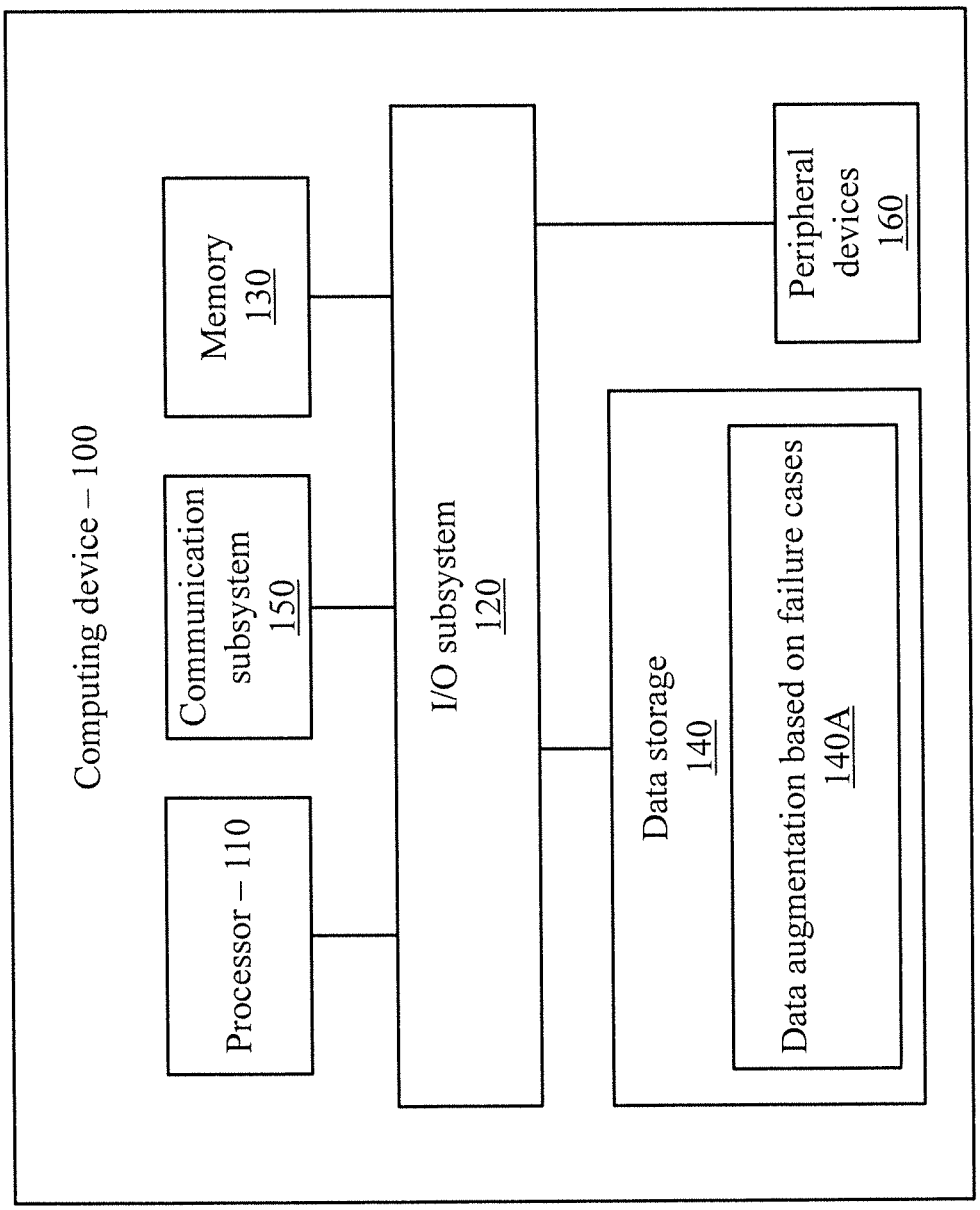
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured to perform data augmentation based on failure cases.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, memory devices and circuits, memory cards, hard disk drives, solid state drives, or other data storage devices. The data storage device 140 can store program code for data augmentation based on failure cases. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. Further, in another embodiment, a cloud configuration can be used (e.g., see FIGS. 10-11). These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 2:
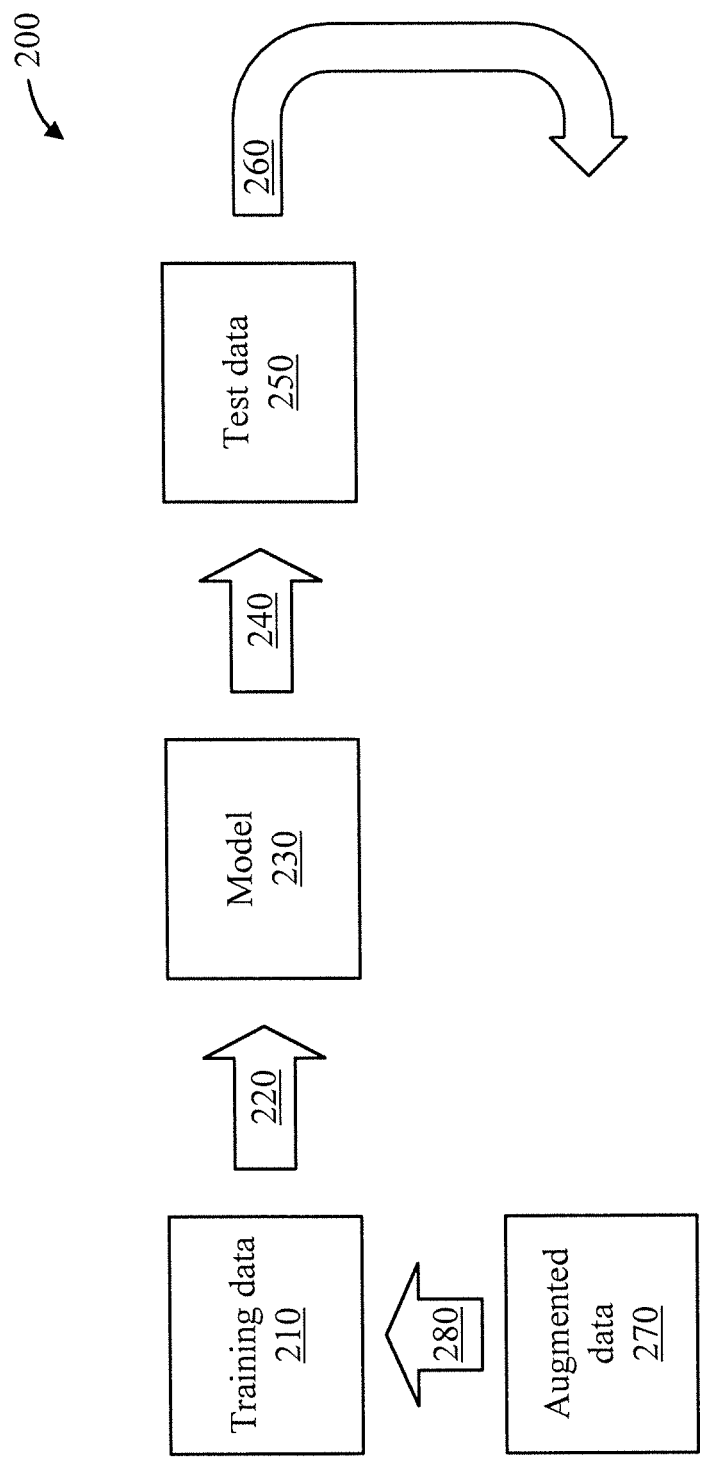
FIG. 2 is a block diagram showing an exemplary architecture, in accordance with an embodiment of the present invention.

These and other variations of a hardware processor subsystem are also contemplated in accordance with embodiments of the present invention FIG. 2 is a block diagram showing an exemplary architecture 200, in accordance with an embodiment of the present invention.

The architecture involves training data 210, training 220 of a model 230 (using the training data 210) to predict 240 test data 250. If the test data 50 is not solvable by the model 230, then the training data 210 is supplemented with augmented data 270 by an augmented data construction step 260 and added 280 to the training data 210 to enable the (augmented) training data 210 to ultimately be solvable by the model 230.

Figure 3:
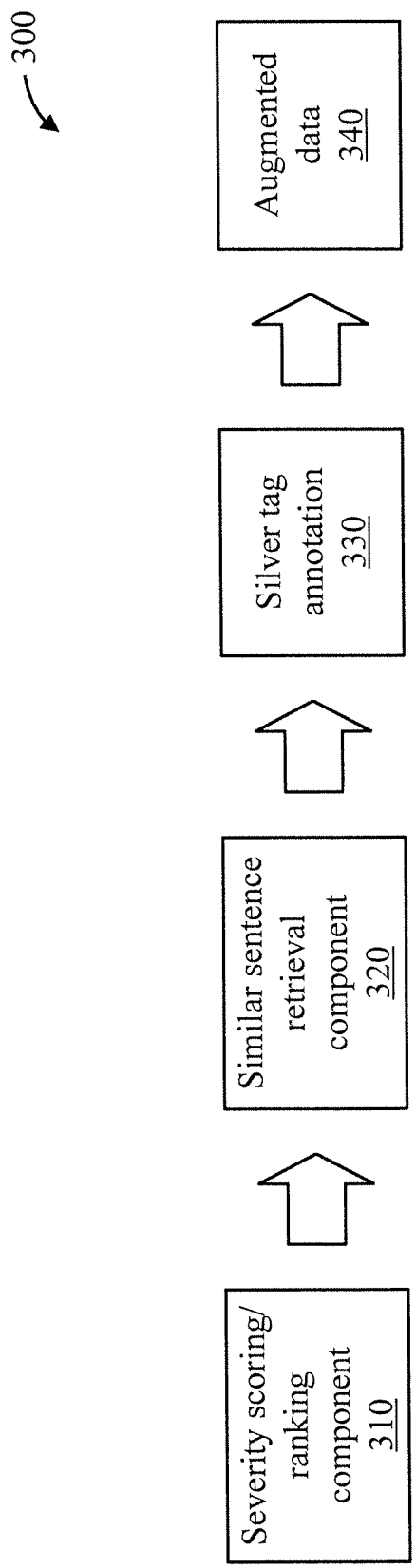
FIG. 3 is a block diagram showing an exemplary system, in accordance with an embodiment of the present invention.

FIG. 3 is a block diagram showing an exemplary system 300, in accordance with an embodiment of the present invention.

The system 300 includes three major components, namely a severity scoring/ranking component 310, a similar sentence retrieval component 320, and a silver tag annotation component 330. From these three components, augmented data 340 is generated.

The severity scoring/ranking component 310 defines and extracts severe errors that fewer models (than a threshold amount) can solve.

The similar sentence retrieval component 320 retrieves sentences similar to severe errors from a raw text corpus.

The silver tag annotation component 330 assigns semi-gold (silver) tags with the retrieved sentences. A gold tag is a manually curated ground truth. A semi-gold (silver) tag is an automatically generated label by one or multiple models/classifiers.

A further description will now be given regarding the severity scoring/ranking component 310, in accordance with an embodiment of the present invention.

In one or more embodiments, severe errors are defined as errors that only a few models cannot solve (e.g., less than a threshold amount). These errors can potentially be solved with other techniques or architectures. On the other hand, errors that no model can solve should be considered ignorable.

In one or more embodiment, a severity score is defined over an error case so that the following severity score properties are met: the score should be 0 if no models (and all models) can solve the error case; and the score should increase as the number of failure models decreases (the score should be largest with only one failure model).

The following notation is involved in the severity scoring/ranking component 310:
- $(x_i, y_j)$: i-th instance in tested data,
- $x_i$: input sentence,
- $y_i$: gold label,
- $N$: number of models,
- $y^*_{ij}$: i-th prediction by j-th model,
- $y^*_{ij}$: prediction probability distribution over labels for i-th instance by j-th model,
- $y^{*l}_{ij}$: prediction probability for l-th label in i-th instance by j-th model,
- $\sigma_a$: step function activated at x=a (e.g. a=0.5), and
- dim (v): the dimensionality of v.

In an embodiment, a definition of severity score (SevScore) can be as follows:

$$\text{(Elaborated) } SevScore(x) = \frac{1}{\Gamma(k)\theta^k} x^{k-1} e^{-x/\theta} - \text{①},$$

$$\text{s.t. } k > 1, \theta < 1, k\theta = 1\left(x \leftarrow \#_{mf}(y^*_{ij})\right), \#_{mf}(y^*_{ij})\right),$$

where '←' denotes a substitution of a left term with a right term, $$\#_{mf}(y^*_{ij}) = \sum_j \sigma_a(p_{unc}(y^*_{ij})),$$

$$p_{unc}(y^*_{ij}) = \sum\left(\frac{y^{*l}_{ij} \log y^{*l}_{ij}}{\log \frac{1}{\dim(y^*_{ij})}}\right), \text{ and } 0 \leq p_{unc}(y^*_{ij}) \leq 1.$$

① is the probability density function of the gamma distribution in the shape-scale parameterization.

① meets that SevScore(x)=0 and SevScore(1) takes the maximum value in all possible x.

If there are gold labels, then $y_j : p_{unc}(y^*_{ij}) = \sigma_1 [y_i = \text{argmax}_l y^{*l}_{ij}]$.

The function $\#_{mf}(y^*_{ij})$ is also applicable to the situation when there are no gold labels.

In another embodiment, a definition of severity score (SevScore) that is simpler than the above can be (Simple) SevScore(x)=|σ_1(x)−σ_N(x)|(x←#_{mf}(y*_{ij})).

In various embodiments, other conditions can be integrated into SevScore such as number of sentences with specific words in RawCorpus, which is a raw text corpus used for finding similar sentences and introduced later.

Based on the SevScore, failure cases are selected as candidates for augmentation in which a random sampling Sampling based on some probability distributions such as the Uniform distribution can be applied: fail_sents={s|Sampling(SevScore)}.

An interpretation of the definition is as follows:
$\#_{mf}(y^*_{ij})$: number of failure models for i-th instance, and
$p_{unc}(y^*_{ij})$: uncertain probability of j-th model for i-th instance.

The lower $p_{unc}(y^*_{ij})$, the more confident the prediction $y^*_{ij}$.

Elaborated SevScore(x) will be largest when $x=\#_{mf}=1$ and decrease as x increases.

Simple SevScore(x) meets the condition that 1 if x≠0, N else 0 ($x \leftarrow \#_{mf}$).

Figure 4:
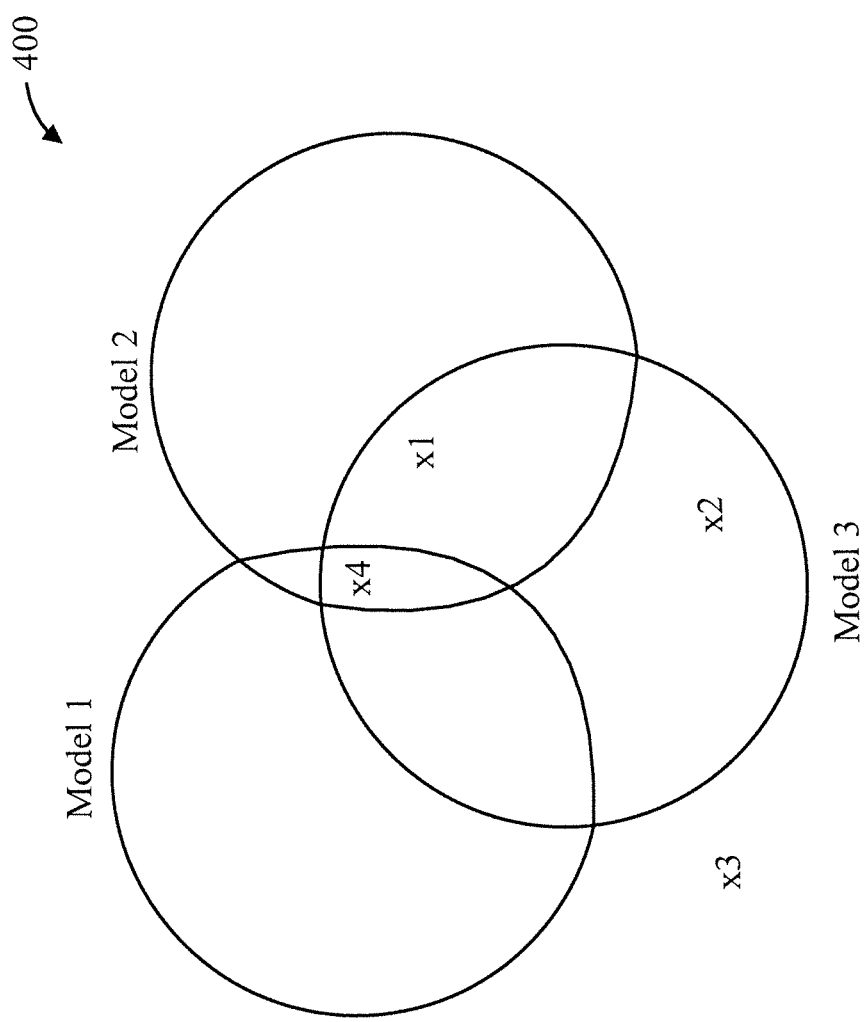
FIG. 4 is a block diagram showing an exemplary solution space, in accordance with an embodiment of the present invention.
Figure 5:
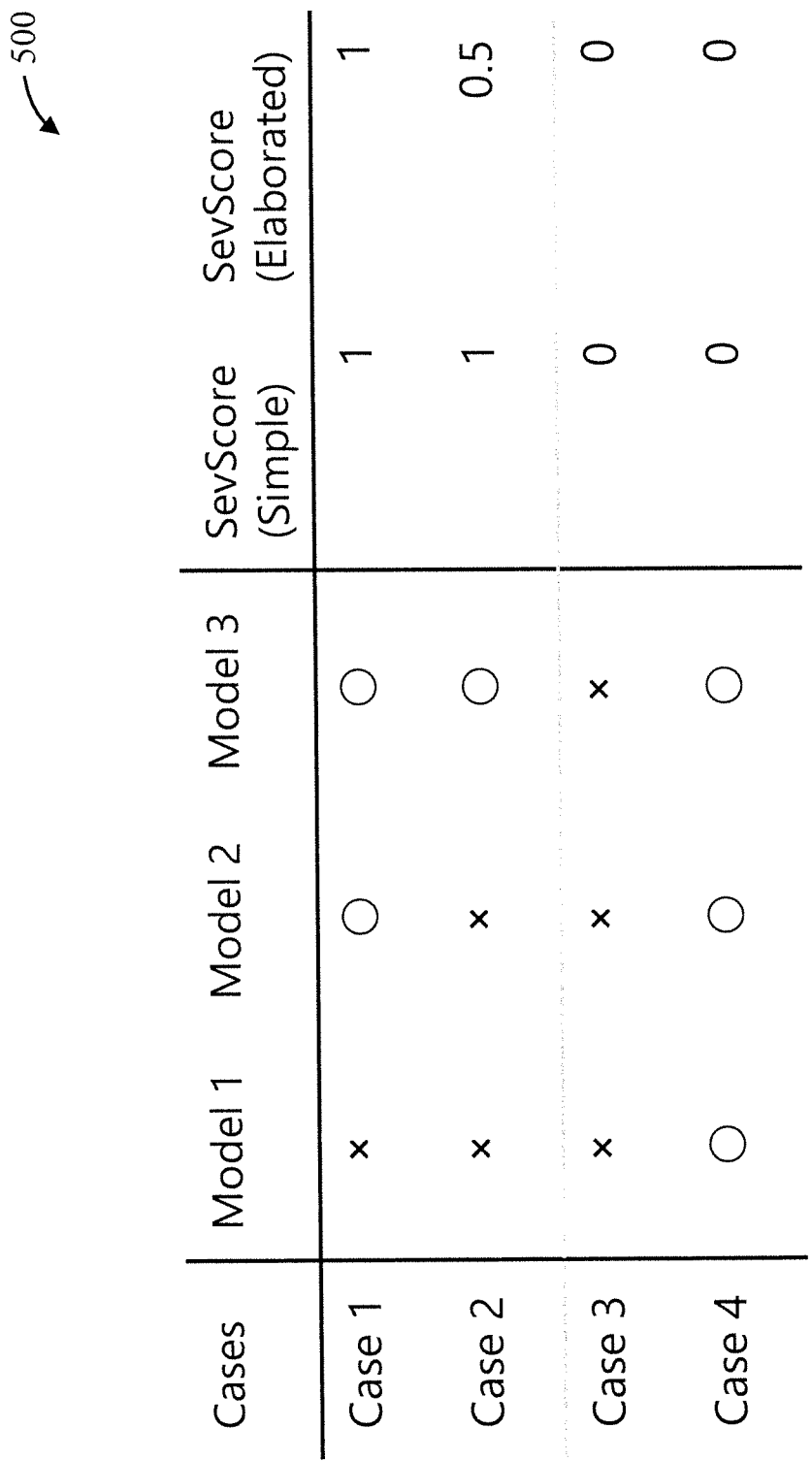
FIG. 5 is a chart showing exemplary severity scores relating to the solution space of FIG. 4, in accordance with an embodiment of the present invention.

FIG. 4 is a block diagram showing an exemplary solution space 400, in accordance with an embodiment of the present invention. FIG. 5 is a chart intuitively showing exemplary severity scores 500 relating to the solution space 400 of FIG. 4, in accordance with an embodiment of the present invention. In FIG. 5, SevScore(x) (k=2, θ=0.5). In FIG. 5, an X is used to denote the situation when a model cannot solve a case, and a ○ is used to denote the situation when a model can solve a case.

In FIG. 4, each circle shows the area of the solution space of a model. xn (n=1, 2, 3, 4) shows a case. Case 1 is not solvable only by Model 1 (and gets the highest score of 1). Case 2 is not solvable by both Model 1 and Model 2 (and gets a score of 0.5). Case 3 is not solvable by any of the models 1 through 3 (and gets a score of 0). Case 4 is easy enough and is solvable by all of the models 1 through 3 (and gets a score of 0). The severity score would be x1>x2>x3, x4, according to the definition.

A further description will now be given regarding the similar sentence retrieval component 320.

Find sentences similar to failure cases from a raw corpus RawCorpus to reinforce the robustness to the failure cases based on the following:
SimSent(fail_sent)={s|sim(s, fail_sent)≥α, s∈RawCorpus},
where SimSent is a function of a failure case fail_sent and returns a set of similar sentences {s} based on a Similarity function sim. α is a hyper-parameter that controls how similar a sentence extracted by SimSent is.

Any similarity function can be used such as cosine similarity and TF-IDF based similarity.

In an embodiment, a Transformer-based sentence encoder pre-trained on Semantic Textual Similarity task is used. This Transformer-based sentence encoder is expected to encode a sentence into a vector representation ($v \in \mathbb{R}^d$) so that semantically similar sentences get closer to each other in the vector space.

An example of a failure case is "We've moved on".

Similar sentences to the failed sentence would include: "we've moved on", "I've moved on", "They've moved on", and "you've moved on".

Similar sentences should depend on the tasks.

For Part of Speech (PoS) tagging, grammatically-similar sentences are more desirable while a slight semantic modification is acceptable.

For example, if a failure case is "We've moved on", then the similar sentences would be "I've moved on", "you've moved on", and "they have moved on".

In contrast, "We've moved to NY" is not acceptable as a similar sentence because the word 'on' in the failure case should be adverb but 'to' in the retrieved sentence is preposition.

For Sentiment Analysis, semantically-similar sentences are more suitable while grammatical modification is permissible.

For instance, when a failure case is "This film was exciting", then, the similar sentences would be "This {movie, photo, picture} was {good, amazing}", where any combination of words in two curly brackets is possible, and the sentiment of the resultant sentences is still consistent with the failure case.

"I enjoyed this film" is also acceptable as a similar sentence because the sentiment is still consistent.

However, "This film was too boring" is not appropriate as a similar sentence because the sentiment is opposed to that of the failure case.

Inappropriate sentences can be filtered out by using the desirable tags.

A further description will now be given regarding semi-gold (silver) tag annotation with the retrieved sentences.

Figure 6:
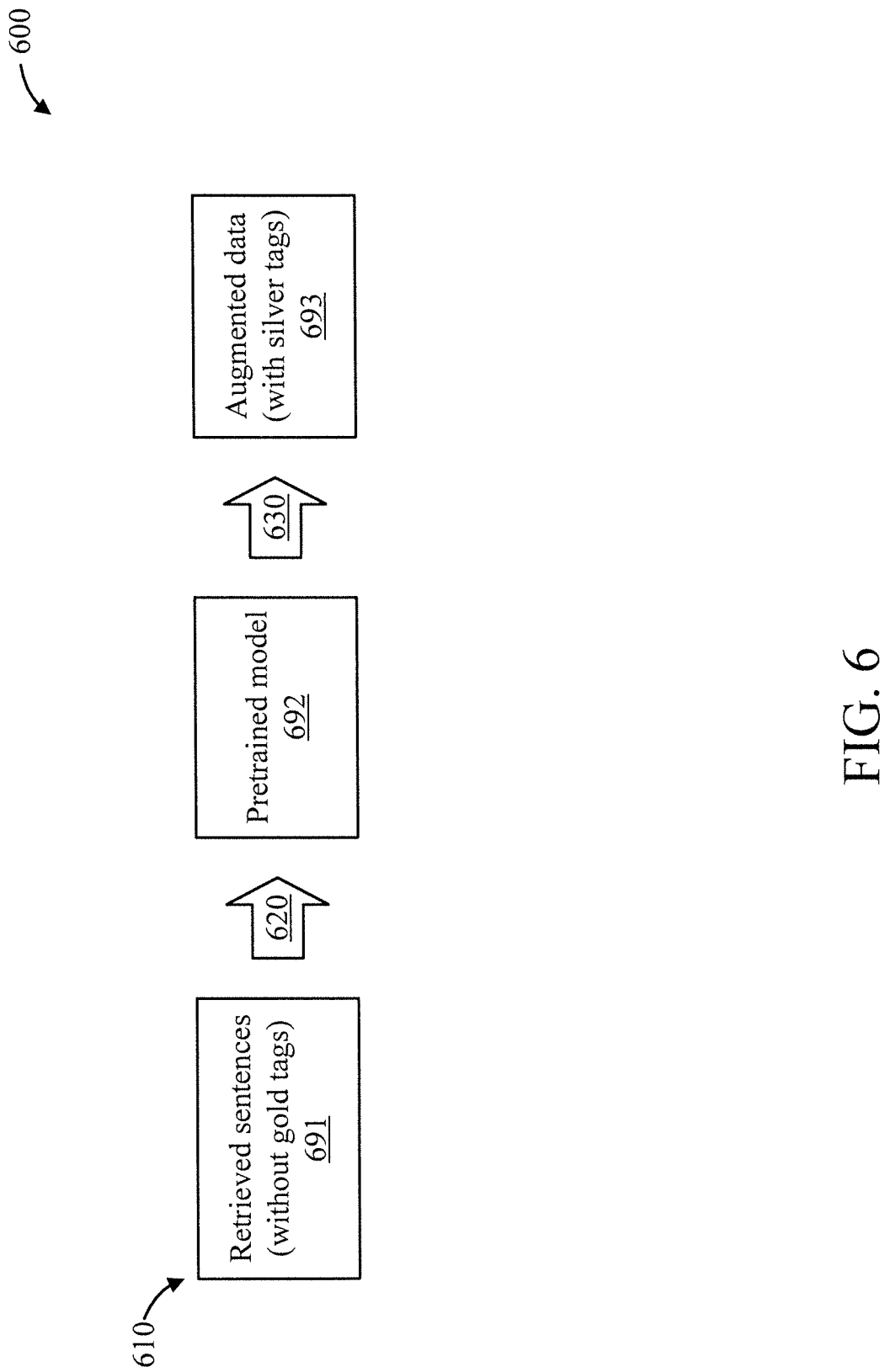
FIG. 6 is a high-level block diagram showing a simple prediction based silver tag annotation, in accordance with an embodiment of the present invention.

FIG. 6 is a high-level block diagram showing a simple prediction based silver tag annotation 600, in accordance with an embodiment of the present invention.

At block 610, retrieve similar sentences 691 from a RawCorpus without using gold tags.

At block 620, input the retrieved sentences 691 into a pretrained model 692.

At block 630, predict the results of the retrieved sentences using the pretrained model 692 and consider them as silver tags and obtain augmented data 693 by attaching the silver (machine-generated) tags with the retrieved sentences 691.

Figure 7:
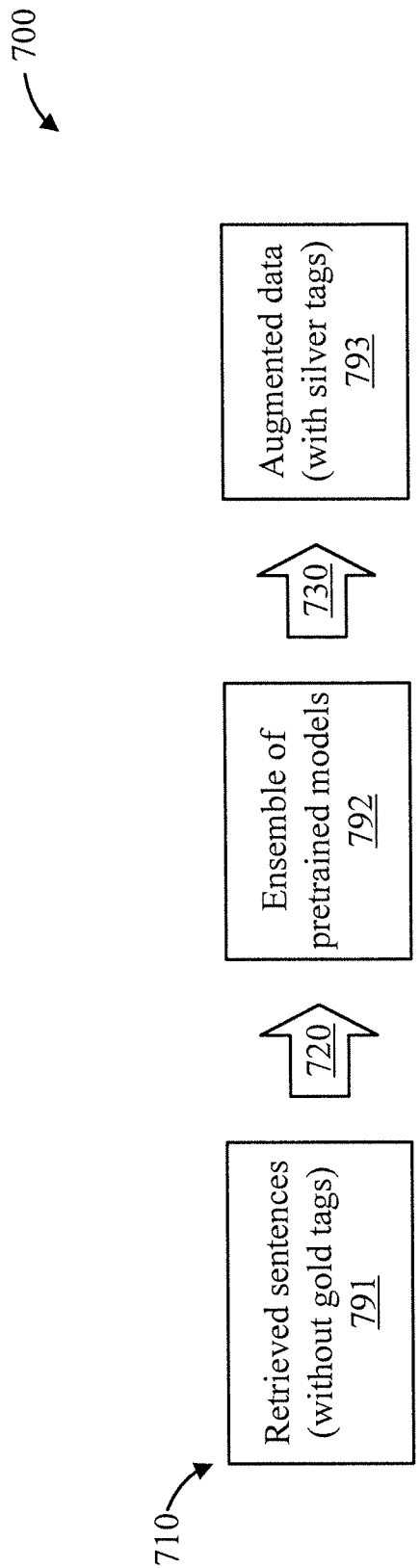
FIG. 7 is a high-level block diagram showing an ensemble prediction based silver tag annotation, in accordance with an embodiment of the present invention.

FIG. 7 is a high-level block diagram showing an ensemble prediction based silver tag annotation 700, in accordance with an embodiment of the present invention.

At block 710, retrieve similar sentences 791 from a RawCorpus without using gold tags.

At block 720, input the retrieved sentences 791 into a set of pretrained models 792.

At block 730, predict the results of the retrieved sentences using the set of pretrained models 792 and decide silver tags using a framework of an ensemble model (e.g., majority voting), and obtain augmented data 793 by attaching the silver (machine-generated) tags with the retrieved sentences 791.

Figure 8:
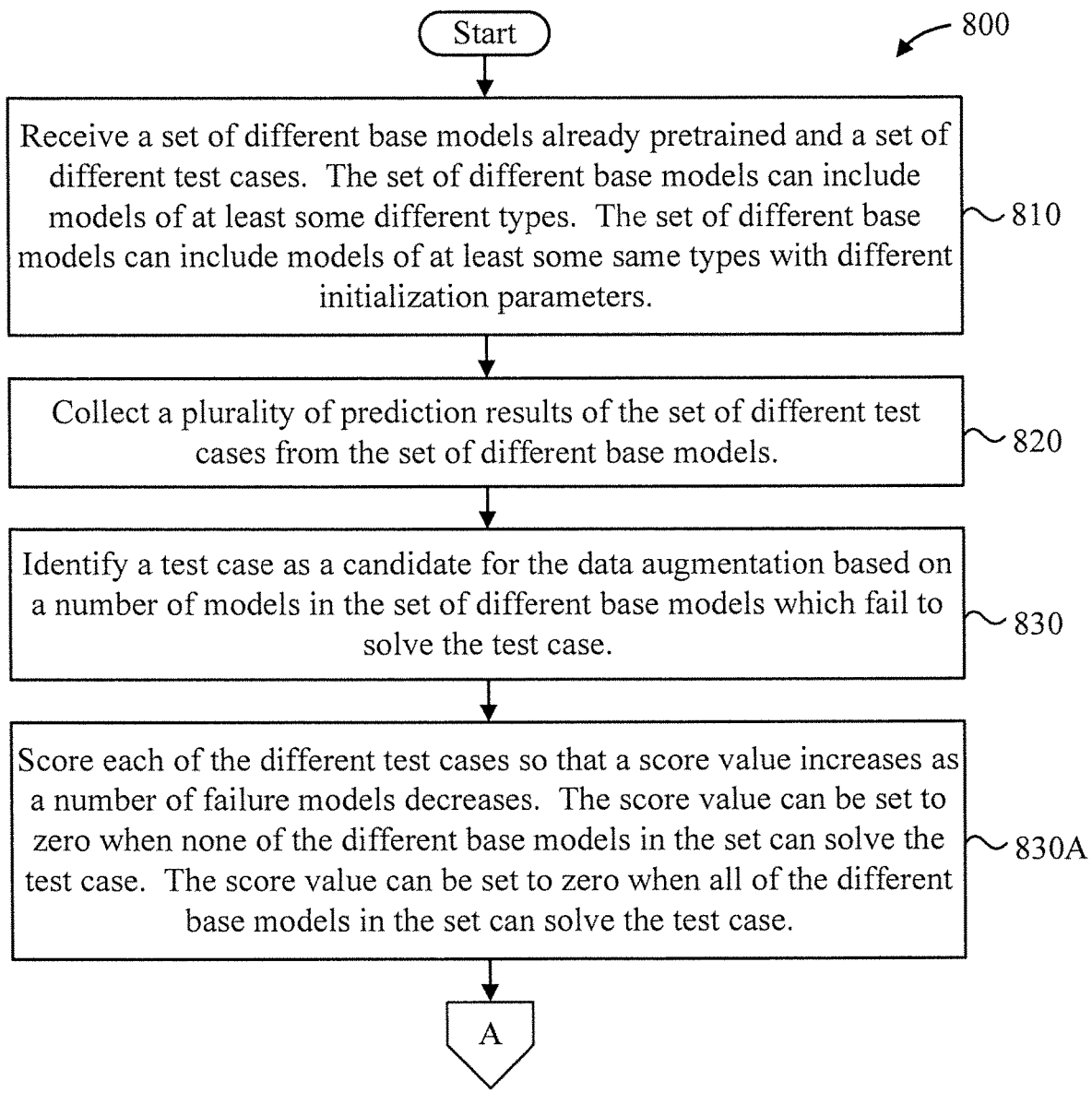
FIGS. 8-9 are flow diagrams showing an exemplary method for data augmentation based on failure cases, in accordance with an embodiment of the present invention.
Figure 9:
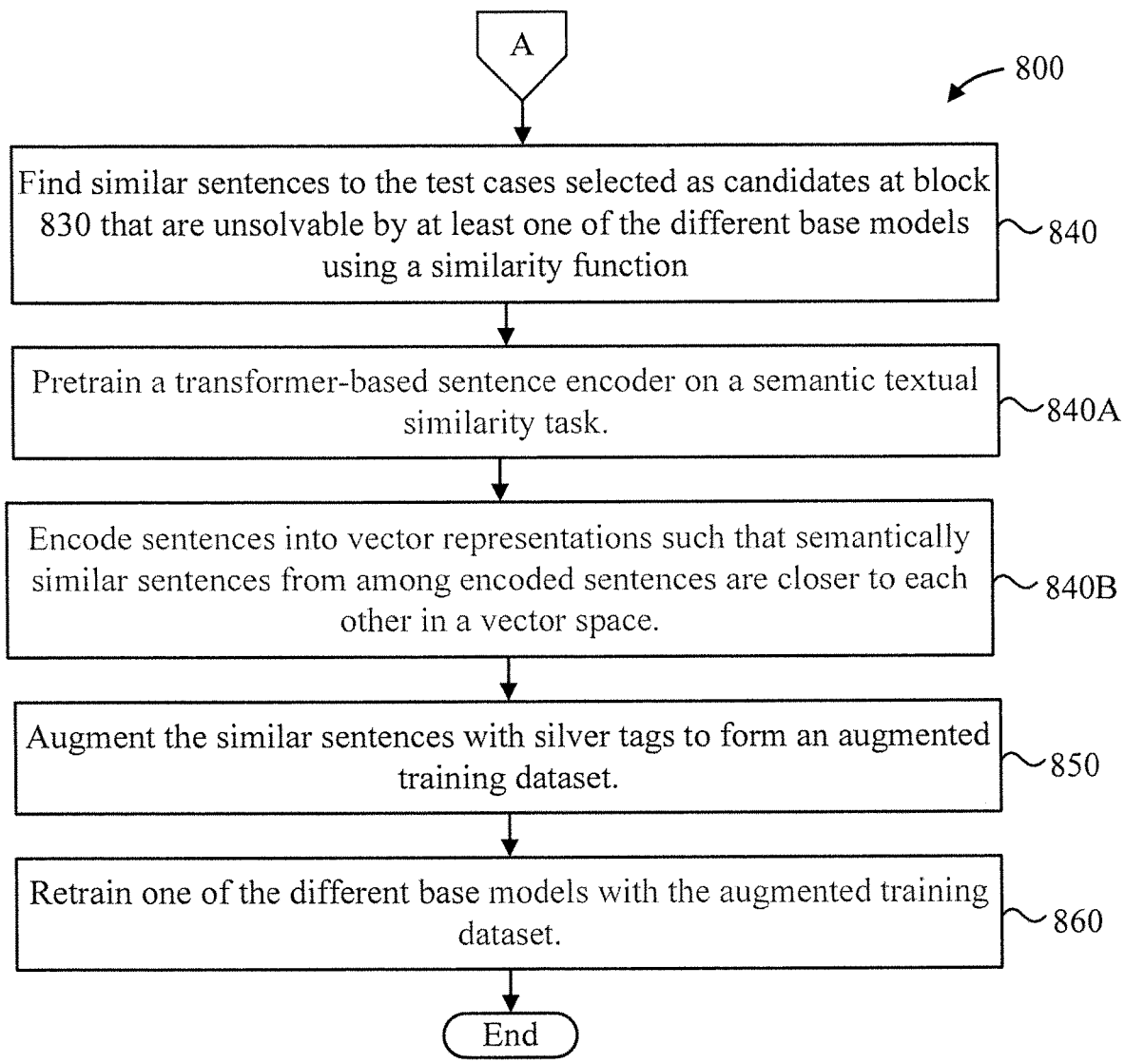

FIGS. 8-9 are flow diagrams showing an exemplary method 800 for data augmentation based on failure cases, in accordance with an embodiment of the present invention.

At block 810, receive a set of different base models already pretrained and a set of different test cases. In an embodiment, the set of different base models can include models of at least some different types. In an embodiment, the set of different base models can include models of at least some same types with different initialization parameters.

At block 820, collect a plurality of prediction results of the set of different test cases from the set of different base models.

At block 830, identify a test case as a candidate for the data augmentation based on a number of models in the set of different base models which fail to solve the test case.

In an embodiment, block 830 can include block 830A.

At block 830A, score each of the different test cases so that a score value increases as a number of failure models decreases. In an embodiment, the score value can be set to zero when none of the different base models in the set can solve the test case. In an embodiment, the score value can be set to zero when all of the different base models in the set can solve the test case.

At block 840, find similar sentences to the test cases selected as candidates at block 830 that are unsolvable by at least one of the different base models using a similarity function.

In an embodiment, block 840 can include one or more of blocks 840A and 840B.

At block 840A, pretrain a transformer-based sentence encoder on a semantic textual similarity task.

At block 840B, encode sentences into vector representations such that semantically similar sentences from among encoded sentences are closer to each other in a vector space.

At block 850, augment the similar sentences with silver tags to form an augmented training dataset.

At block 860, retrain one of the different base models with the augmented training dataset.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
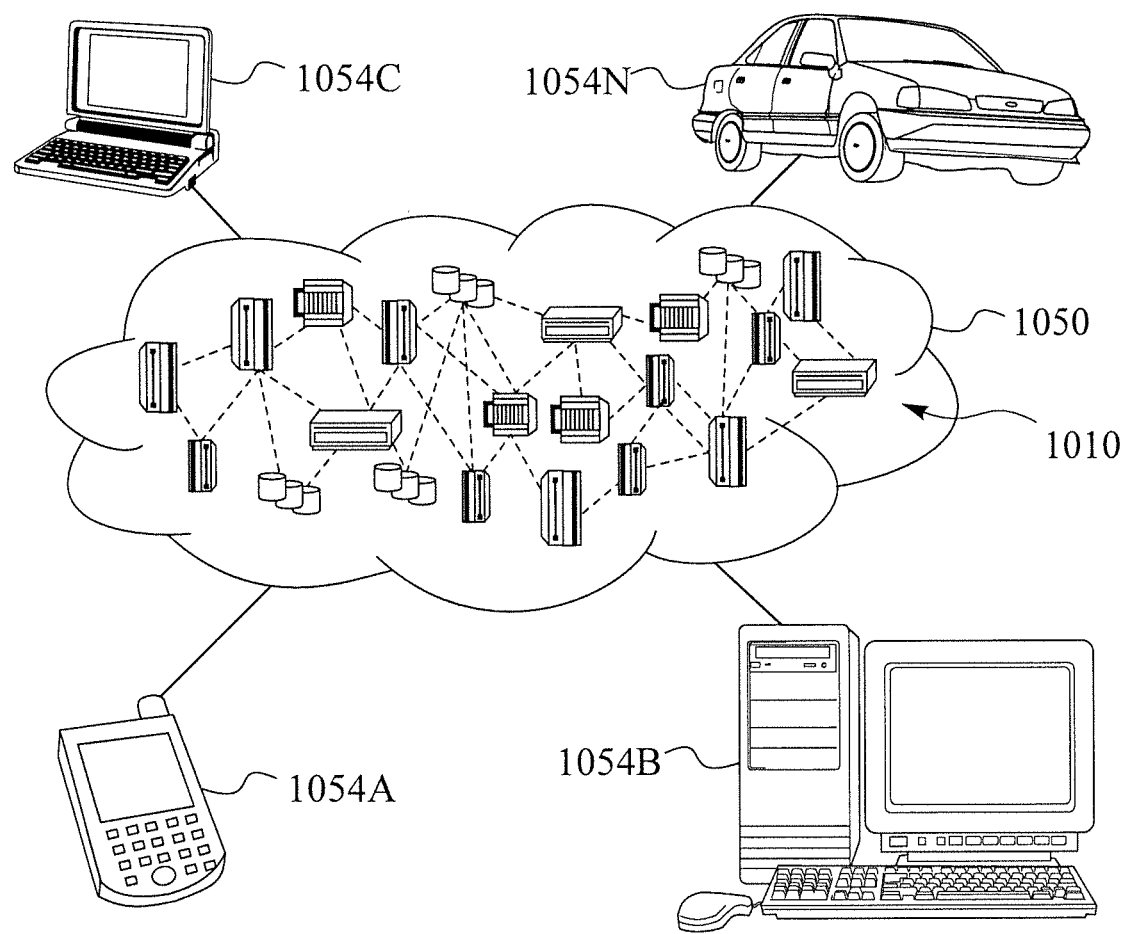
FIG. 10 is a block diagram showing an illustrative cloud computing environment having one or more cloud computing nodes with which local computing devices used by cloud consumers communicate, in accordance with an embodiment of the present invention.

Referring now to FIG. 10, illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1050 can communicate with any type of computerized device over any type of network and/or network addressable connection (e.g., using a web browser).

Figure 11:
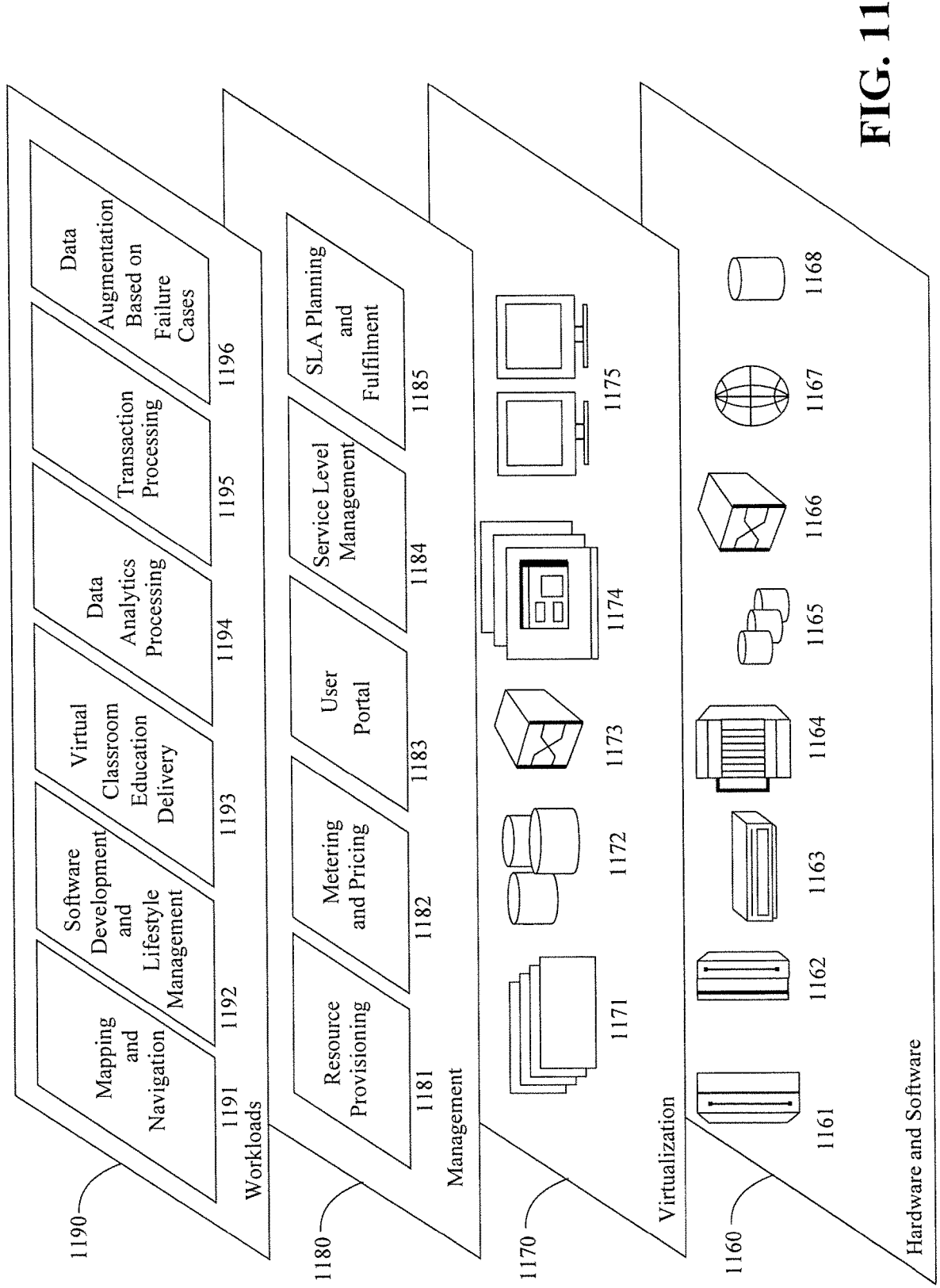
FIG. 11 is a block diagram showing a set of functional abstraction layers provided by a cloud computing environment, in accordance with an embodiment of the present invention.

Referring now to FIG. 11, a set of functional abstraction layers provided by cloud computing environment 1050 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1160 includes hardware and software components. Examples of hardware components include: mainframes 1161; RISC (Reduced Instruction Set Computer) architecture based servers 162; servers 1163; blade servers 1164; storage devices 1165; and networks and networking components 1166. In some embodiments, software components include network application server software 1167 and database software 868.

Virtualization layer 1170 provides an abstraction layer from which the following examples of virtual entities may be provided: virtual servers 1171; virtual storage 1172; virtual networks 1173, including virtual private networks; virtual applications and operating systems 1174; and virtual clients 1175.

In one example, management layer 1180 may provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Examples of workloads and functions which may be provided from this layer include: mapping and navigation 1191; software development and lifecycle management 1192; virtual classroom education delivery 1193; data analytics processing 1194; transaction processing 1195; and data augmentation based on failure cases 1196.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for data augmentation, comprising:
receiving a set of different base models already pretrained and a set of different test cases;
collecting a plurality of prediction results of the set of different test cases from the set of different base models;
identifying a test case as a candidate for the data augmentation based on a metric specifying a number of models in the set of different base models which fail to solve the test case and a severity score based on identified severe errors the severe errors being errors which fewer than a threshold amount of models in the set of different base models can solve, the severity score being calculated using a probability density function of a gamma distribution;
augmenting, by a processor device, the identified test case with additional data to form an augmented training dataset; and
retraining at least some of the different base models with the augmented training dataset.

2. The computer-implemented method of claim 1, further comprising:
collecting, from the set of different test cases based on similarity criteria, one or more cases similar to the identified test case as candidates for the data augmentation; and
obtaining label data corresponding to each of the one or more cases by using at least one of the different base models in the set of different base models.

3. The computer-implemented method of claim 2, wherein the similarity criteria comprises having at least some same parts of speech in a same order.

4. The computer-implemented method of claim 2, wherein the similarity criteria comprises having at least a same sentiment.

5. The computer-implemented method of claim 4, further comprising permitting grammatical modification in the similarity criteria as long as the same sentiment is maintained.

6. The computer-implemented method of claim 1, wherein identifying a test case as a candidate for the data augmentation includes scoring each of the different test cases so that a score value increases as a number of failure models decreases.

7. The computer-implemented method of claim 6, wherein the score value is set to zero when none of the different base models in the set can solve the test case.

8. The computer-implemented method of claim 6, wherein the score value is set to zero when all of the different base models in the set can solve the test case.

9. The computer-implemented method of claim 1, wherein said augmenting the test case step comprises:
finding similar sentences to any of the different test cases that are unsolvable by at least one of the different base models using a similarity function; and
augmenting the similar sentences with silver labels to form the augmented training dataset.

10. The computer-implemented method of claim 9, wherein said finding similar sentences comprises:
pretraining a transformer-based sentence encoder on a semantic textual similarity task; and
encoding sentences into vector representations such that semantically similar sentences from among encoded sentences are closer to each other in a vector space.

11. The computer-implemented method of claim 1, wherein the set of different base models comprise models of at least some different types.

12. The computer-implemented method of claim 1, wherein the set of different base models comprise models of at least some same types with different initialization parameters.

13. The computer-implemented method of claim 1, wherein said identifying the test case uses a model ensemble to obtain silver tags for the candidate for the data augmentation.

14. The computer-implemented method of claim 1, wherein said identifying the test case uses the severity score to rank potential candidates for the data augmentation, the severity score calculated based on a prediction probability distribution over labels by a given one of the different base models.

15. The computer-implemented method of claim 14, wherein the severity score is further calculated based on a number of sentences with specific words in a raw corpus.

16. A computer program product for data augmentation, the computer program product comprising a non-transitory computer readable storage medium having program instructions embodied therewith, the program instructions executable by a computer to cause the computer to perform a method comprising:

receiving, by a processor device of the computer, a set of different base models already pretrained and a set of different test cases;

collecting, by the processor device, a plurality of prediction results of the set of different test cases from the set of different base models;

identifying, by the processor device, a test case as a candidate for the data augmentation based on a metric specifying a number of models in the set of different base models which fail to solve the test case and a severity score based on identified severe errors, the severe errors being errors which fewer than a threshold amount of models in the set of different base models can solve, the severity score being calculated using a probability density function of a gamma distribution;

augmenting, by the processor device, the identified test case with additional data to form an augmented training dataset; and retraining, by the processor device, at least some of the different base models with the augmented training dataset.

17. The computer program product of claim 16, wherein the method further comprises:

collecting, from the set of different test cases based on similarity criteria, one or more cases similar to the identified test case as candidates for the data augmentation; and obtaining label data corresponding to each of the one or more cases by using at least one of the different base models in the set of different base models.

18. The computer program product of claim 16, wherein identifying a test case as a candidate for the data augmentation includes scoring each of the different test cases so that a score value increases as a number of failure models decreases.

19. The computer program product of claim 16, wherein said identifying the test case uses the severity score to rank potential candidates for the data augmentation, the severity score calculated based on a prediction probability distribution over labels by a given one of the different base models.

20. A computer processing system for data augmentation, comprising:

a memory device for storing program code; and a processor device operatively coupled to the memory device for running the program code to:

receive a set of different base models already pretrained and a set of different test cases;

collect a plurality of prediction results of the set of different test cases from the set of different base models;

identify a test case as a candidate for the data augmentation based on a metric specifying a number of models in the set of different base models which fail to solve the test case and a severity score based on identified severe errors, the severe errors being errors which fewer than a threshold amount of models in the set of different base models can solve the severity score being calculated using a probability density function of a gamma distribution;

augment the identified test case with additional data to form an augmented training dataset; and retrain at least some of the different base models with the augmented training dataset.

* * * * *